UNITED STATES PATENT OFFICE.

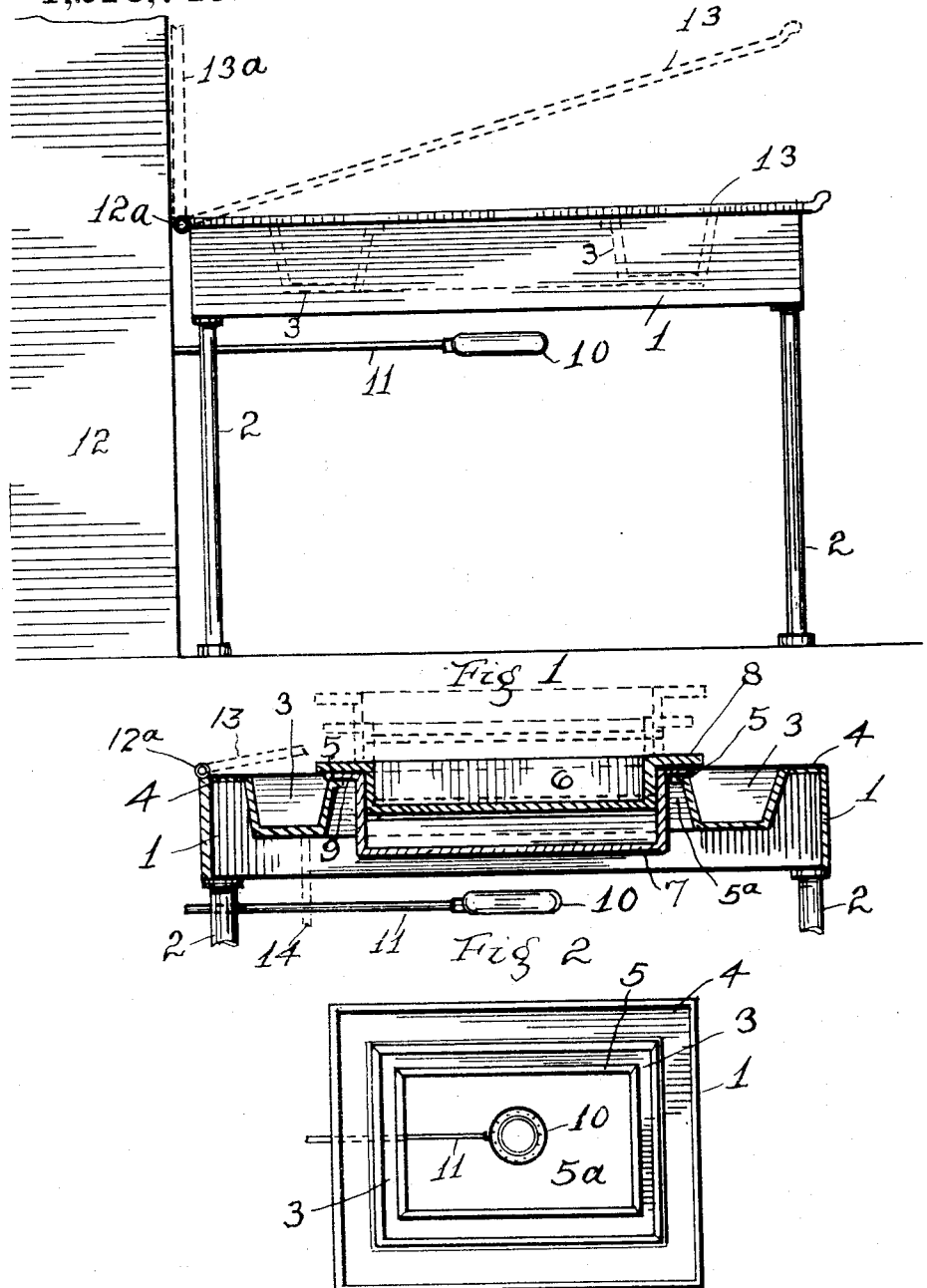

PAUL M. TAYLOR, OF NORFOLK, VIRGINIA.

PHOTOGRAPHIC-PRINT-TONING APPARATUS.

1,216,748.  Specification of Letters Patent.  Patented Feb. 20, 1917.

Application filed January 10, 1916. Serial No. 71,279.

*To all whom it may concern:*

Be it known that I, PAUL M. TAYLOR, a citizen of the United States, residing at Norfolk, in the county of Norfolk and State of Virginia, have invented certain new and useful Improvements in Photographic-Print-Toning Apparatus, of which the following is a specification.

My invention relates to photographic print toning apparatus.

The object of the invention is to provide a simple device for toning prints which will be convenient and cleanly and also to facilitate the handling of prints while being toned by the agency of chemicals and heat.

Further objects and advantages will be more fully described herein and specifically pointed out in the claims hereunto annexed, recourse being had to the accompanying drawing forming a part of this specification in which:

Figure 1 is a side view.

Fig. 2 is a sectional elevation, and Fig. 3 is a plan.

In the drawing like reference numerals indicate similar parts in all the several views.

1 is the stand or outer member having sides and ends but without a bottom and is preferably of a square or rectangular shape in plan.

2 are standards or legs for supporting the stand at a proper height for operating.

3 is a trough or gutter of the same shape in plan as the stand 1 and is smaller than the said stand and extends around the inside thereof and is provided with tapering sides, as shown, and secured to the top portion 4 as shown in Fig. 2.

5 is a flange on the inner edge of the trough or gutter 3 and acts as a rest for the hereinafter described pans.

5ª, Fig. 3, is an open space for the pans formed by the gutter and over which the pans are placed, 6 being the top or solution pan and 7 the lower or water bath pan, one telescoping or nesting within the other, as shown in Fig. 2.

The pans 6 and 7 have flanges 8 and 9, respectively, so as to enable them to be held in position on the flange 5 of the gutter and over the space 5ª also as a convenient hand hold in removing them when desired.

In toning prints it is necessary to apply heat to the solutions held in the pan 6, therefore the pan 7 is supplied with water which is heated by the burner 10 placed at a suitable distance from it and communicating by the pipe 11, with a gas supply.

12 represents the wall of the room against which the apparatus is usually placed for convenience in getting connections for gas and water.

13 is a cover hinged to the stand 1 at 12ª, 13ª shown by dotted lines in Fig. 1, representing the cover raised and placed vertically against the wall 12 which acts as a means for preventing the wall from being soiled by splashes from the solution pan 6.

When the cover is closed as shown by the full lines 13 in Fig. 1, the entire inner portion of the stand 1 is closed, thus protecting the contents of the pan 6.

14 shown by dotted lines in Fig. 2, indicates the approximate position of a drain pipe should it be desired to use it so that solutions finding their way into the gutter 3 may be carried off so that an accumulation of liquid is prevented.

The pan 6 may be readily lifted from the water pan 7 and the latter, also, may be easily lifted from the trough or gutter at will.

As the operation of my device may be easily understood and as the construction thereof is plainly seen, further description is unnecessary.

I claim:

1. A device of the class described comprising an open bottom stand having a trough or gutter around the inner portion thereof, said gutter adapted to receive a pan or pans for suspending the same within the said stand.

2. A device of the class described comprising an open bottom outer stand having a tapered walled gutter or trough around the inner portion thereof, a set of telescoping or nesting removable pans or receptacles having flanges thereon adapted to be suspended within and inclosed by said gutter or trough, and cover means for said stand and the pans.

In testimony whereof I affix my signature in presence of two witnesses.

PAUL M. TAYLOR.

Witnesses:
HAROLD JONES,
A. J. FISCHER.

Copies of this patent may be obtained for five cents each, by addressing the "Commissioner of Patents, Washington, D. C."